United States Patent
Kim et al.

(10) Patent No.: US 7,020,051 B2
(45) Date of Patent: Mar. 28, 2006

(54) OPTICAL PICKUP CAPABLE OF DETECTING AND/OR COMPENSATING FOR SPHERICAL ABERRATION

(75) Inventors: Tae-kyung Kim, Seoul (KR); Young-man Ahn, Gyeonggi-do (KR); Hae-jung Suh, Gyeonggi-do (KR); Chong-sam Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 09/984,886

(22) Filed: Oct. 31, 2001

(65) Prior Publication Data

US 2002/0101798 A1  Aug. 1, 2002

(30) Foreign Application Priority Data

Dec. 8, 2000  (KR) .............................. 2000-74797

(51) Int. Cl.
*G11B 7/095* (2006.01)
*G11B 7/135* (2006.01)

(52) U.S. Cl. .............................. 369/44.23; 369/112.15; 369/112.12

(58) Field of Classification Search ........... 369/112.15, 369/112.12, 44.23, 112.02, 44.32, 53.28, 369/53.13, 53.14, 112.17, 112.23, 121, 120, 369/44.41

See application file for complete search history.

(56) References Cited

U.S. PATENT DOCUMENTS

| 4,458,980 | A | * | 7/1984 | Ohki et al. ............... 369/44.14 |
|---|---|---|---|---|
| 5,181,193 | A | * | 1/1993 | Kume et al. .............. 369/44.23 |
| 5,777,976 | A | * | 7/1998 | Dang ..................... 369/112.04 |
| 5,828,643 | A | * | 10/1998 | Takeda et al. ......... 369/112.12 |
| 5,909,424 | A |   | 6/1999 | Lee et al. |
| 5,991,254 | A | * | 11/1999 | Lee et al. ............... 369/112.15 |
| 6,063,468 | A | * | 5/2000 | Aratani et al. ........... 369/275.1 |
| 6,125,088 | A | * | 9/2000 | Ogasawara ............... 369/44.32 |
| 6,185,176 | B1 | * | 2/2001 | Sugiura et al. .......... 369/112.1 |
| 6,399,932 | B1 | * | 6/2002 | Wals ....................... 250/201.5 |
| 6,430,137 | B1 | * | 8/2002 | Saimi et al. ............. 369/112.1 |
| 6,498,330 | B1 | * | 12/2002 | Yoshida ................... 369/112.1 |
| 6,510,111 | B1 | * | 1/2003 | Matsuura ................. 369/44.32 |
| 6,628,582 | B1 | * | 9/2003 | Furukawa ................ 369/44.32 |

FOREIGN PATENT DOCUMENTS

| EP | 0 762 396 A1 | 3/1997 |
|---|---|---|
| EP | 0 936 603 A2 | 8/1999 |
| EP | 0 953 974 A2 | 11/1999 |
| JP | 63-161537 | 7/1988 |

(Continued)

OTHER PUBLICATIONS

U.S. Appl. No. 09/986,454, filed Nov. 8, 2001, Byung-in Ma et al.

(Continued)

*Primary Examiner*—Brian E. Miller
*Assistant Examiner*—Peter Vincent Agustin
(74) *Attorney, Agent, or Firm*—Stein, McEwen & Bui, LLP

(57) ABSTRACT

An optical pickup is provided for a recording medium, including: a light source generating and emitting a light beam; a light beam division and detection unit dividing a particular light beam portion of the light beam after being reflected/diffracted from the recording medium into sub-divided light beams portions, and detecting the sub-divided light beam portions; and a spherical aberration detection circuit processing the sub-divided light beam portions to detect spherical aberration caused by thickness variation of the recording medium.

47 Claims, 11 Drawing Sheets

FOREIGN PATENT DOCUMENTS

| | | |
|---|---|---|
| JP | 05-182203 | 7/1993 |
| JP | 11-086305 | 3/1999 |
| JP | 2000-003526 | 1/2000 |
| JP | 2000-021014 | 1/2000 |
| JP | 2000-057616 | 2/2000 |
| JP | 2000-155979 | 6/2000 |
| JP | 2000-171346 | 6/2000 |
| JP | 2000-182254 | 6/2000 |
| JP | 2000-190125 | 7/2000 |

OTHER PUBLICATIONS

U.S. Appl. No. 10/374,715, filed Feb. 27, 2003, Seong-sue Kim et al.

\* cited by examiner

SPHERICAL ABERRATION COEFFICIENT [λ]

FOCUS COEFFICIENT [λ]

OPTICAL PICKUP CAPABLE OF DETECTING AND/OR COMPENSATING FOR SPHERICAL ABERRATION

CROSS-REFERENCE TO RELATED APPLICATIONS

This application claims the benefit of Korean Application No. 2000-74797, filed Dec. 8, 2000, in the Korean Industrial Property Office, the disclosure of which is incorporated herein by reference.

BACKGROUND OF THE INVENTION

1. Field of the Invention

The present invention relates to an optical pickup, and more particularly, to an optical pickup detecting spherical aberration caused by thickness deviation of a recording medium, and/or compensating for spherical aberration caused by the thickness variation of a recording medium.

2. Description of the Related Art

In general, information recording/reproduction density increases as a size of a light spot focused on a recording medium in an optical pickup apparatus becomes smaller. The shorter a wavelength ($\lambda$) of light used and the larger a numerical aperture (NA) of an objective lens, the smaller the size of a light spot, which is expressed by equation (1):

$$\text{size of light spot } \alpha \ \lambda/NA \quad (1)$$

To reduce the size of the light spot focused on the recording medium in order to obtain a higher recording density, there is a need to construct an optical pickup with a short wavelength light source, such as a blue semiconductor laser, and an objective lens having a larger NA. A format for increasing recording capacity up to 22.5 GB with a 0.85-NA objective lens, and for reducing the thickness of a recording medium to 0.1 mm is desired so as to prevent degradation of performance caused by tilting of the recording medium. Here, the thickness of the recording medium is defined as a distance from a light incident surface of the recording medium to an information recording surface.

As shown in equation (2) below a spherical aberration $W_{40d}$ is proportional to a fourth power of the NA of the objective lens and to a deviation of the thickness of the recording medium. For this reason, if an objective lens with a high NA of about 0.85 is adopted, the recording medium must have a uniform-thickness with a deviation less than ±3 μm. However, it is very difficult to manufacture the recording medium within the above thickness deviation range.

$$W_{40d} = \frac{n^2 - 1}{8n^3}(NA)^4 \Delta d \quad (2)$$

FIG. 1 is a graph showing a relation between thickness deviation of the recording medium and wavefront aberration (optical path difference (OPD)) caused by a thickness deviation when a 400-nm light source and an objective lens having an NA of 0.85 are used. As shown in FIG. 1, the wavefront aberration increases proportionally with the thickness deviation. Thus, when the objective lens having a high NA, for example, an NA of 0.85, is adopted, there is a need to correct for spherical aberration caused by the thickness deviation of the recording medium.

FIG. 2 shows a conventional optical pickup detecting and correcting aberration, which is disclosed in Japanese Patent Publication No. hei 12-155979. Referring to FIG. 2, the conventional optical pickup includes a light source 10, an objective lens 17, which focuses a light beam emitted from the light source 10 onto a recording medium 1, and a half mirror 11 altering a traveling path of the light beam passed through the objective lens 11 after being reflected from the recording medium 1. A hologram optical element (HOE) 20 divides and deflects an incident light beam from the half mirror 11 into a light beam passing through a particular region and a light beam passing through another region. A photodetector unit 21 includes first through fourth photodetectors 21a, 21b, 21c, and 21d, which detect the light beam passed through the particular region (See FIG. 4). A signal processing circuit 23 detects aberration from the detection signals of the first through fourth photodetectors, and a wavefront changing device 25 changes the shape of a wavefront of the light beam going toward the recording medium 1 from the light beam source 10 according to a signal from the signal processing circuit 23. In FIG. 2, a collimating lens 13 collimates the light beam emitted and diverging from the light source 10.

FIG. 3 illustrates wavefront aberration resulting from spherical aberration. When spherical aberration occurs, retarded wavefronts 27a and 27b, which are symmetrical around an optical axis c, are generated with respect to a reference wavefront 27 at the aperture center. When spherical aberration occurs, leading wavefronts, which are symmetrically around the optical axis c, may be generated.

As shown in FIG. 4, the HOE 20 includes first and second diffraction areas 20a and 20b which select, divide and diffract a retarded wavefront portion such that divided light beam portions are symmetrical with respect to an x-axis crossing an optical axis and go toward the first and fourth photodetectors 21a and 21d. The HOE 20 also includes a third diffraction area 20c, which diffracts the light beam portion excluding the retarded wavefront portion above the x-axis such that a diffracted light beam portion goes toward the second photodetector 21b. A transmission area 20d transmits the light beam portion below the x-axis such that a transmitted light beam portion goes toward the third photodetector 21c. The first and second diffraction areas 20a and 20b have a semicircular shape.

Each of the first and fourth photodetectors 21a and 21d has a 2-sectional configuration with which the occurrence of spherical aberration can be detected by detecting the focus status. Each of the second and third photodetectors 21b and 21c has a 2-sectional configuration with which a focus error signal can be detected using a knife edge method.

FIGS. 5A through 5C illustrate the variations of light beam patterns received by the first through fourth photodetectors 21a, 21b, 21c, and 21d according to occurrence of wavefront aberration. In particular, FIG. 5A illustrates light beam patterns received by the first through fourth photodetectors 21a, 21b, 21c, and 21d when a retarded wavefront occurs. Retarded wavefront portions, which are diffracted by the first and second diffraction areas 20a and 20b of the HOE 20, are focused behind the first and fourth photodetectors 21a and 21d. The light beam patterns received by the first and fourth photodetectors 21a and 21d are symmetrical. Relatively higher amplitude signals are detected by a first section A of the first photodetector 21a and a second section D of the fourth photodetector 21d, compared with a second section B of the first photodetector 21a and a first section C of the fourth photodetector 21d. FIG. 5B illustrates light beam patterns received by the first through fourth photodetectors 21a, 21b, 21c, and 21d when no aberration occurs. As shown in FIG. 5B, the first and second sections A and B of the first photodetector 21a detect signals having the same magnitude. Also, the first and second sections C and D of the fourth photodetector 21d detect light signals having the same amplitude. FIG. 5C illustrates the light beam patterns received by the first through fourth photodetectors 21a through 21d when a leading wavefront occurs. In this case, the leading wavefront portions, which are diffracted by the first and second diffraction areas 20a and 20b, are focused before the first and fourth photodetectors 21a and 21d. Relatively higher amplitude signals are detected by the second section B of the first photodetector 21a and the first section C of the fourth photodetector 21d, compared to the first section A of the first photodetector 21a and the second section D of the fourth photodetector 21d.

Thus, a spherical aberration signal SES' is detected by subtracting a sum of a detection signal b of the second section B of the first photodetector 21a and a detection signal c of the first section C of the fourth photodetector 21d, from a sum of a detection signal a of the first section A of the first photodetector 21a and a detection signal d of the second section D of the fourth photodetector 21d, which is expressed as:

$$SES' = (a+d) - (b+c) \quad (3)$$

If this conventional aberration detection method is applied, both an amount and a polarity of aberration can be detected with respect to a small amount of spherical aberration. Meanwhile, when a large amount of spherical aberration occurs due to saturation of the signal difference, only the polarity of the spherical aberration, not the amount thereof, can be detected.

Another drawback of the conventional aberration detection method lies in that predetermined amplitude of spherical aberration signal SES' is detected even when only a predetermined amount of defocus occurs without spherical aberration. Defocus $W_{20}$ is proportional to the square of an NA of an objective lens, which is expressed as formula (4). Thus, a the degree of retarding and leading in wavefronts caused by defocus and spherical aberration differs, but the characteristics of the retarded and leading wavefronts caused by defocus and spherical aberration are very similar.

$$W_{20} = \frac{1}{2} \Delta z N A^2 \quad (4)$$

where $\Delta z$ is the amount of movement of an image point.

SUMMARY OF THE INVENTION

Various objects and advantages of the invention will be set forth in part in the description that follows and, in part, will be obvious from the description, or may be learned by practice of the invention.

To solve the above problems, it is an object of the present invention to provide an optical pickup accurately detecting spherical aberration caused by thickness variation of a recording medium without being affected by defocus, and/or capable of compensating for such spherical aberration.

According to an aspect of the present invention, there is provided an optical pickup for a recording medium, including: a light source generating and emitting a light beam; an objective lens focusing the light beam from the light source to form a light spot on the recording medium; an optical path changer disposed on an optical path between the light source and the objective lens, altering a traveling path of the light beam; a light beam division and detection unit dividing a particular light beam portion of the light beam passed through the objective lens after being reflected/diffracted from the recording medium into sub-divided light beams portions, and detecting the sub-divided light beam portions; and a spherical aberration detection circuit processing detection signals resulting from the particular light beam portion from the light beam division and detection unit to detect spherical aberration caused by thickness variation of the recording medium.

The light beam division and detection unit divides the particular light beam portion into a first light beam portion on an axis crossing an optical axis parallel to a radial direction or a tangential direction of the recording medium, and second and third light beam portions, one at either side of the first light beam portion in the tangential direction or the radial direction of the recording medium, and detects a first detection signal from the first light beam portion, and a second detection signal from the second and third light beam portions.

In this case, the light beam division and detection unit includes: a hologram optical element comprising first, second, and third pattern areas dividing/diffracting the particular light beam portion into the first, second, and third light beam portions; and a photodetector unit including a first photodetector receiving the first light beam portion passed through the first pattern area and outputting the first detection signal, and a second photodetector receiving the second and third light beam portions passed through the second and third pattern areas and outputting the second detection signal.

The recording medium has a land-groove structure where the light beam radiated onto the recording medium is reflected and diffracted into $0^{th}$-order and $\pm 1^{st}$-order diffracted light beams, the $\pm 1^{st}$-order diffracted light beams partially overlapping at an exit pupil of the objective lens, and where the particular light beam portion corresponds to an overlapping portion of the $\pm 1^{st}$-order diffracted light beams.

The recording medium may have a format satisfying the equation:

$$\frac{\lambda}{2 x N A x G w} < 1$$

where $\lambda$ denotes a wavelength of the light source, NA denotes a numerical aperture of the objective lens, and Gw denotes a groove width of the recording medium.

The photodetector unit further includes a third photodetector receiving a remaining light beam portion passed through the hologram optical element, excluding the particular light beam portion, and detecting an information reproduction signal from the recording medium, a focus error signal, and/or a tracking error signal.

The optical pickup further includes a spherical aberration compensation element on an optical path between the optical path changer and the objective lens to correct spherical aberration caused by thickness variation of the recording medium, wherein the spherical aberration compensation element is driven according to a spherical aberration signal detected by the spherical aberration detection circuit.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE PREFERRED EMBODIMENTS

Figure 1:
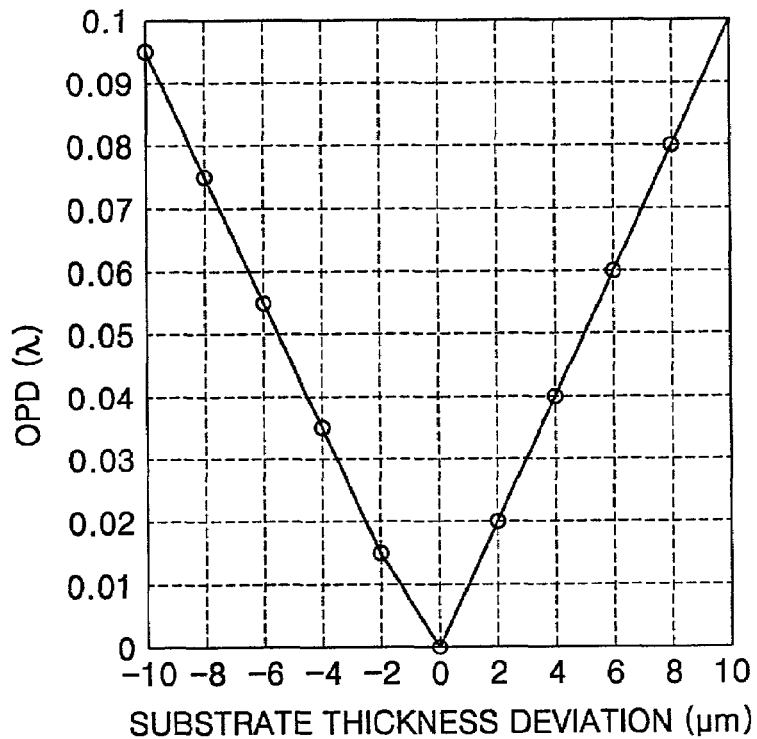
FIG. 1 is a graph showing a relation between a thickness deviation of a recording medium and wavefront aberration (optical path difference (OPD)) caused by the thickness deviation.
Figure 2:
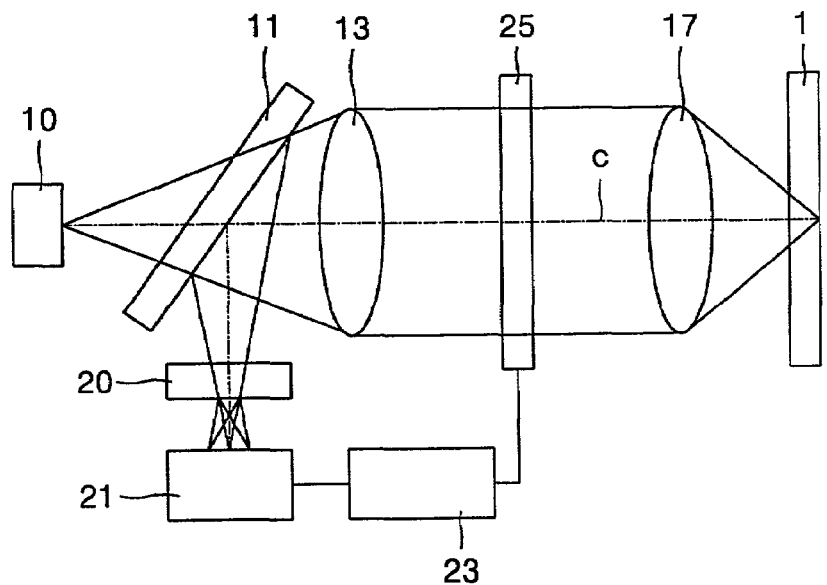
FIG. 2 illustrates a conventional optical pickup detecting and correcting spherical aberration.
Figure 3:
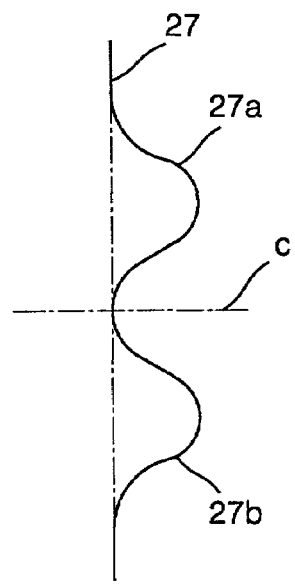
FIG. 3 illustrates wavefront aberration caused by spherical aberration.
Figure 4:
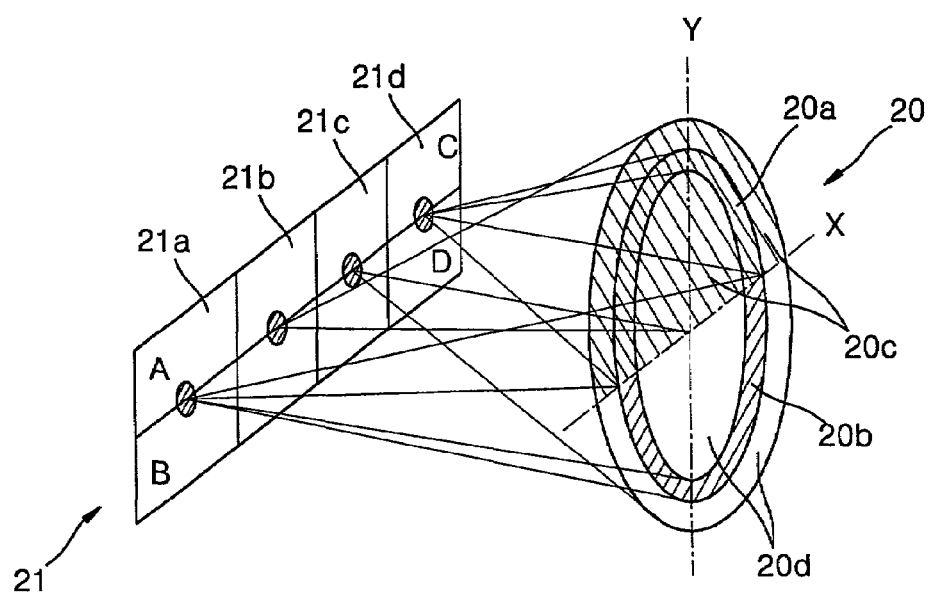
FIG. 4 illustrates configurations of a hologram and a photodetector unit of FIG. 2.
Figure 5A:
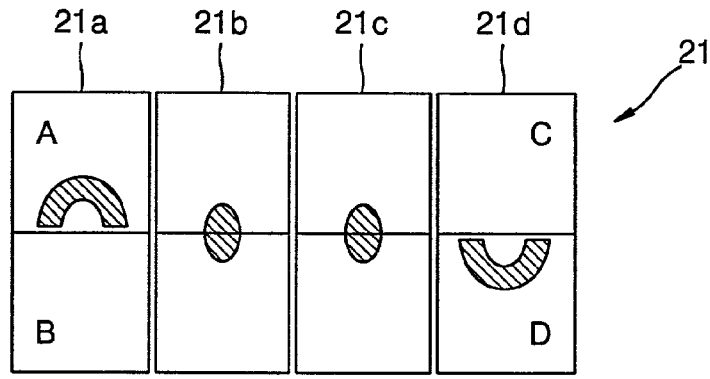
FIGS. 5A illustrates light beam patterns received by the photodetector unit of when a retarded wavefront occurs.
Figure 5B:
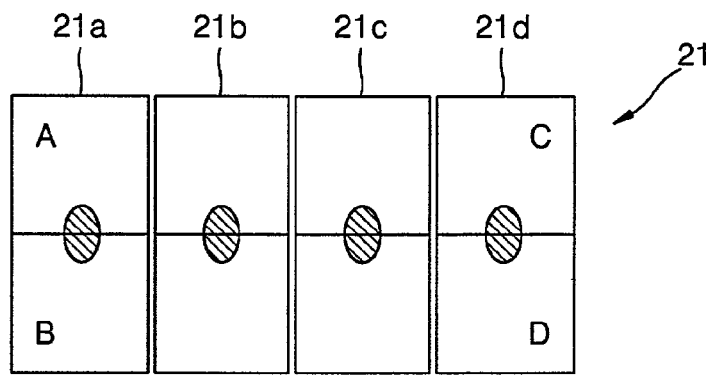
FIG. 5B illustrates light beam patterns received by the photodetector unit when no aberration occurs.
Figure 5C:
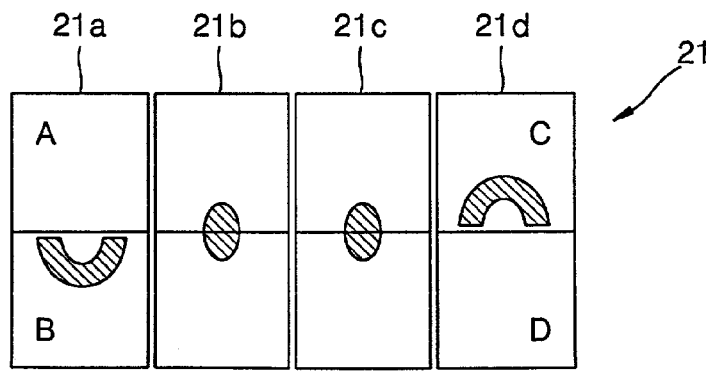
FIG. 5C illustrates light beam patterns received by the photodetector unit when a leading wavefront occurs.
Figure 6:
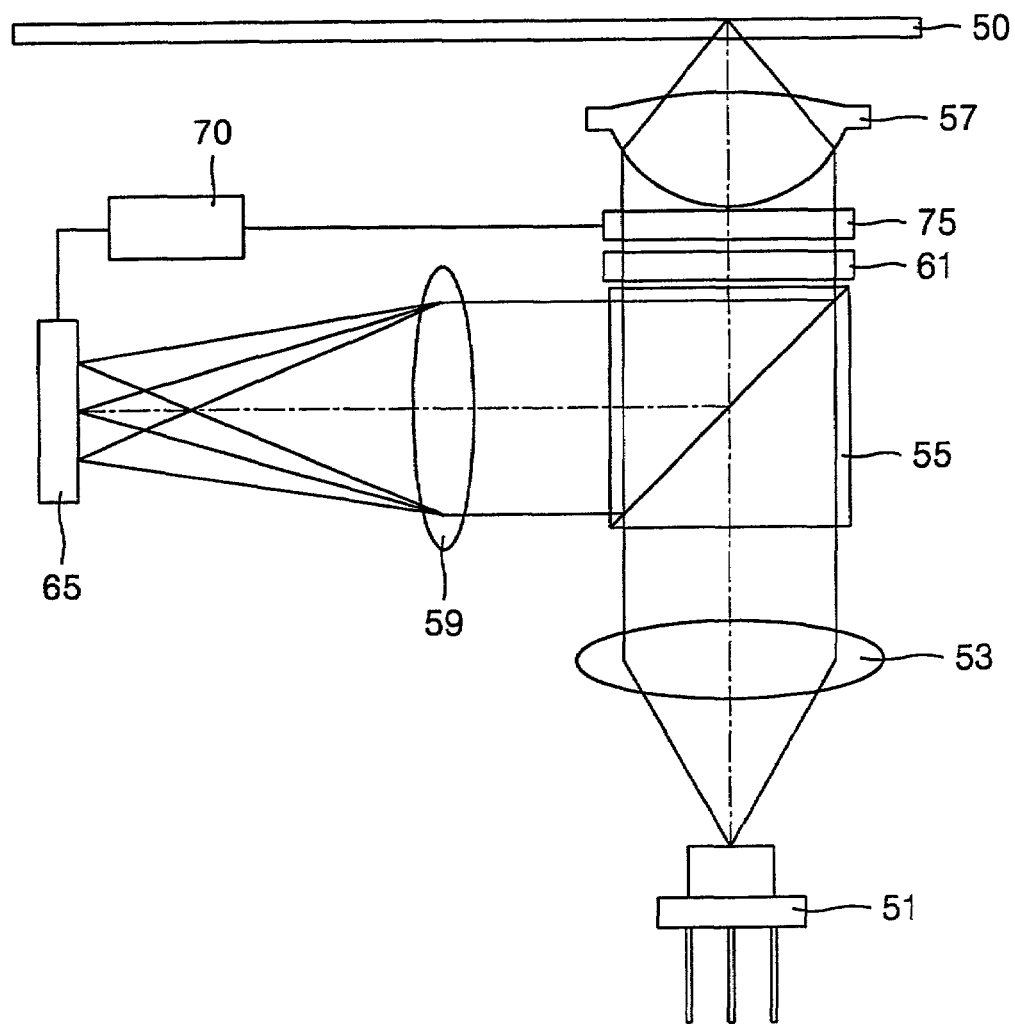
FIG. 6 illustrates an optical arrangement of an embodiment of an optical pickup according to the present invention.

An optical arrangement of an exemplary embodiment of an optical pickup according to the present invention is illustrated in FIG. 6. The optical pickup according to the present invention, includes a light source 51 which generates and emits a light beam, an objective lens 57 which focuses an incident light beam emitted from the light source 51 to form a light spot on a recording medium 50, and an optical path changer disposed on an optical path between the light source 51 and the objective lens 57, which alters the traveling path of an incident light beam.

The photodetector 65 as a light beam division and detection unit, is constructed such that the photodetector 65 divides and detects the light beam passed back through the objective lens 57 and the optical path changer after being reflected/diffracted on the recording medium 50. A spherical aberration detection circuit 70 detects a spherical aberration signal according to thickness variations of the recording medium 50 by processing a plurality of detection signals from the light beam division and detection unit.

The light source 51 may be a semiconductor laser, such as an edge emitting laser or a vertical cavity surface emitting laser (VCSEL). A beam splitter 55 may be used as the optical path changer, transmitting and reflecting the incident light beam in a predetermined ratio. Alternatively, the optical path changer may be a combination of a polarizing beam splitter (not shown), which selectively transmits or reflects the incident light beam according to a polarization of the incident light beam, and a quarter-wave plate (not shown), which changes a phase of the incident light beam between the polarization beam splitter and the objective lens 57.

The optical pickup according to the present invention may be used to record or reproduce on/from a next generation DVD family recording medium 50 by using a blue-light semiconductor laser as the light source 51 to emit a beam having a wavelength of 400–420 nm, for example, 405 nm, and a condensing lens as the objective lens 57 having an NA of 0.7 or greater, for example an NA of 0.85.

The optical pickup according to the present invention further includes a collimating lens 53 on the optical path between the light source 51 and the beam splitter 55, for collimating a diverging light beam emitted from the light source 51, and a sensing lens 59 on the optical path between the beam splitter 55 and the photodetector unit 65 for condensing the incident light beam such that the light beam is received by the photodetector unit 65.

In an exemplary embodiment, the photodetector unit 65, as the light beam division and detection unit, divides a particular light beam portion of the incident beam passed back through the objective lens 57 after being reflected/diffracted on/from the recording medium 50 into a plurality of sub-divided light beam portions, and detects the plurality of the sub-divided light beam portions, where an intensity distribution of the particular light beam portion is affected by the thickness variations of the recording medium.

In particular, as described below, a variation of the intensity distribution of the particular light beam portion according to a direction of spherical aberration is symmetrical about an axis crossing the optical axis, parallel to a tangential or radial direction of the recording medium. The intensity distribution of the particular light beam is inversed according to the direction of spherical aberration. The light beam division and detection unit divides the particular light beam portion into a first light beam portion on the axis crossing the optical axis, parallel to the radial or tangential direction, and second and third light beam portions around the first light beam portion in the tangential or radial direction of the recording medium 50. The photodetector 65 detects the first, second and third light beam portions to generate a first detection signal from the first light beam portion, and a second detection signal from the second and third light beam portions.

In an exemplary embodiment of the present invention, the light beam division and detection unit may include a hologram optical element (HOE) 61, which divides/diffracts the particular light beam portion into the first, second and third light beam portions, and the photodetector unit 65, which receives the first, second, and third light beam portions divided/diffracted by the HOE 61. The light beam division and detection unit would output the first detection signal with respect to the first light beam portion, and the second detection signal with respect to the second and third light beam portions. The HOE 61 may be arranged between the beam splitter 55 and the objective lens 57.

The photodetector unit 65 may be constructed such that the photodetector unit 65 separately receives the light beam portion excluding the particular light beam portion from the HOE 61 and the particular light beam portion. In this case, the photodetector 65 outputs a particular light beam portion detection signal corresponding to the particular light beam portion, to detect a spherical aberration signal, and a rest of light beam portion detection signal output from the photodetector unit 65 corresponding to the light beam portion excluding the particular light beam portion indicative of an information reproduction signal. It will be appreciated that an information reproduction signal may also be detected from the particular light beam portion detection signal, instead of from the rest of the light beam portion detection signal. Alternatively, the photodetector unit 65 or another photodetector may be used as the light beam division and detection unit, with a divided configuration corresponding to the HOE 61.

A spherical aberration detection circuit 70 detects a spherical aberration signal according to the thickness variation of the recording medium by processing the plurality of detection signals resulting from the particular light beam portion, which are output from the light beam division and detection unit. Here, the spherical aberration signal is not affected by defocus.

The spherical aberration detection circuit 70 normalizes a subtraction signal obtained by subtracting the second detection signal resulting from the second and third light beam portions from the first detection signal resulting from the first light beam portion, where the light beam division and detection unit outputs the first and second detection signals with respect to a sum of the first and second detection signals, so that a spherical aberration signal SES is detected. Alternatively, the spherical aberration detection circuit 70 can be constructed such that the spherical aberration signal SES is detected by subtracting the second detection signal from the first detection signal. Here, the spherical aberration detection circuit 70 may be constructed such that the spherical aberration signal SES is detected by amplifying at least one of the first and second detection signals with a predetermined gain factor and processing the amplified at least one of the first and second detection signals.

The optical pickup according to the present invention may also include a spherical aberration compensation element 75 on the optical path between the HOE 61 and the objective lens 57 to compensate for spherical aberration caused by thickness variation of the recording medium 50 according to the spherical aberration signal SES detected by the spherical aberration detection circuit 70.

A liquid crystal plate manufactured by injecting liquid crystals between two transparent substrates having electrode patterns may be used as the spherical aberration compensation element 75. Due to an anisotropic property of the liquid crystal with respect to a refractive index, a phase of the light beam passing through the liquid crystal plate changes. In particular, the liquid crystal plate is driven according to the spherical aberration signal SES such that the shape of the wavefront of the incoming light beam is changed into an inverse shape of the spherical aberration, thereby compensating for the spherical aberration caused by thickness variation. In this case, a driving circuit (not shown) driving the spherical aberration compensation element 75 may be included in or may be separate from the spherical aberration detection circuit 70.

The light beam division and detection unit of the optical pickup according to the present invention, which has the configuration described above to detect and/or correct spherical aberration, will be described below with reference to a case using the next generation DVD family recording medium with lands and grooves (hereinafter, referred to as "land-groove type recording medium") as the recording medium 50. The land-groove type recording medium has a format satisfying the following equation:

$$\frac{\lambda}{2 \times NA \times Gw} < 1 \tag{5}$$

where $\lambda$ denotes a wavelength of the light source 51, NA denotes a numerical aperture of the objective lens 57, and Gw denotes a groove width of the recording medium.

Figure 7:
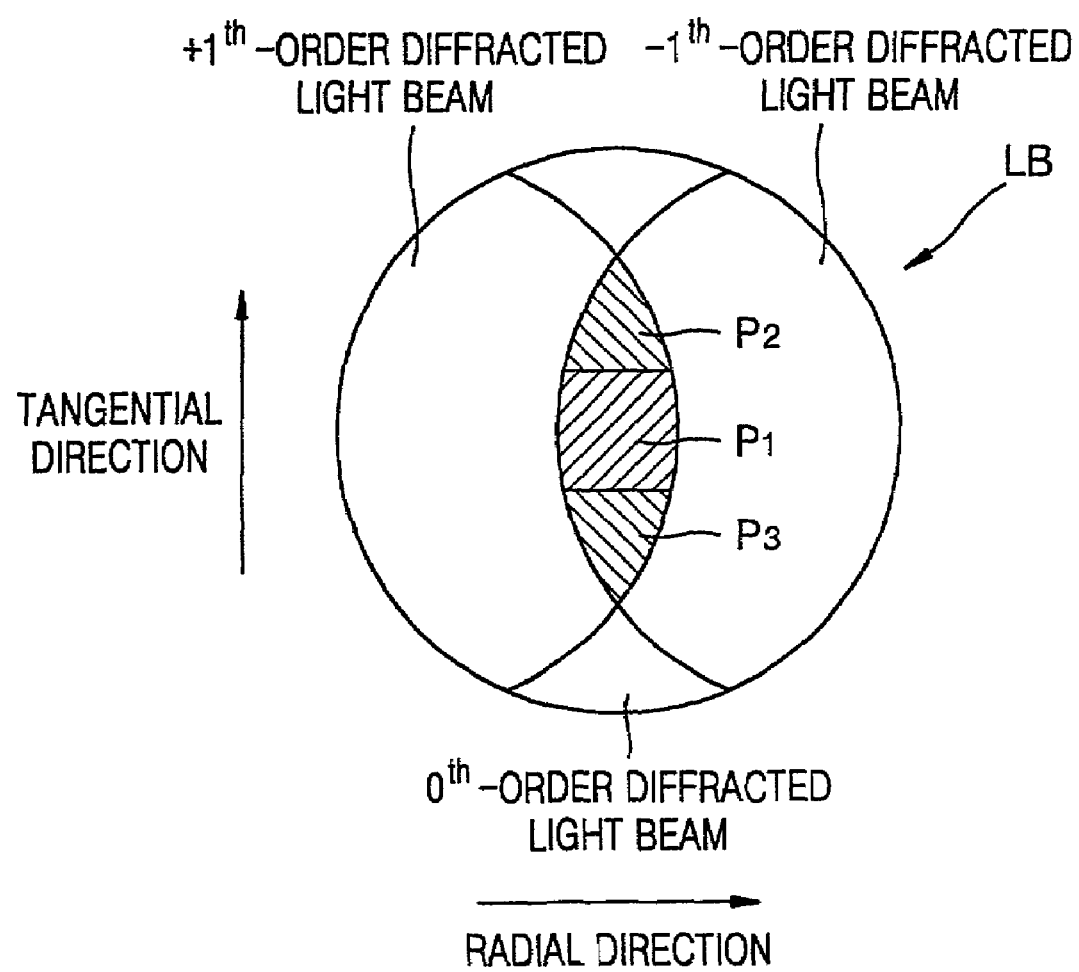
FIG. 7 illustrates light beams reflected/diffracted by a next generation DVD family land/groove type recording medium, viewed from an exit pupil of an objective lens of the optical pickup of FIG. 6.

The land-groove type recording medium reflects and diffracts an incident light beam into $0^{th}$ order light beam and $\pm 1^{st}$ order light beams in a radial direction. As a result, as shown in FIG. 7, when a light beam LB reflected/diffracted from the recording medium is viewed from the exit pupil of the objective lens 57, the $\pm 1^{st}$ order diffracted light beams partially overlap.

Figure 8A:
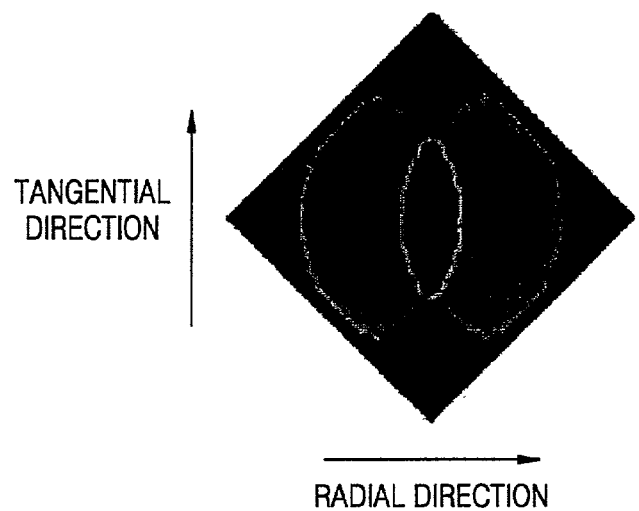
FIG. 8A illustrates a profile of the reflected/diffracted light beams of FIG. 7 according to whether aberration occurs.
Figure 8B:
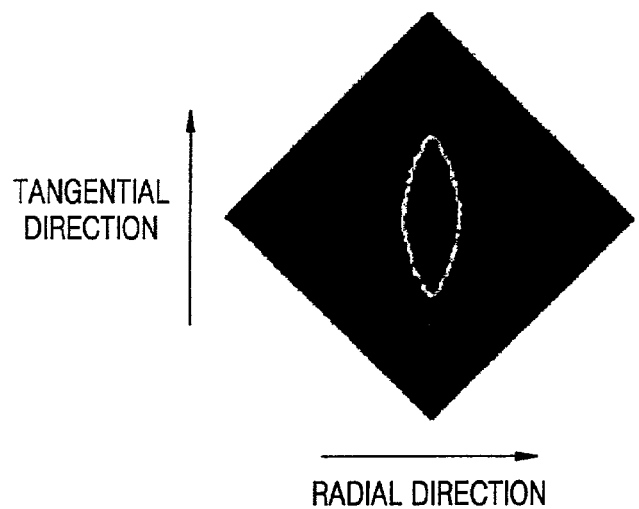
FIG. 8B illustrates a magnified view of a profile of the reflected/diffracted light beams of FIG. 7.
Figure 8C:
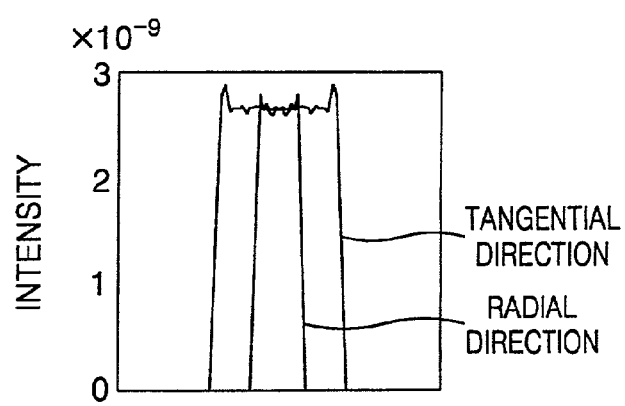
FIG. 8C illustrates an intensity distribution of an overlapping light beam portion in tangential and radial directions.
Figure 9A:
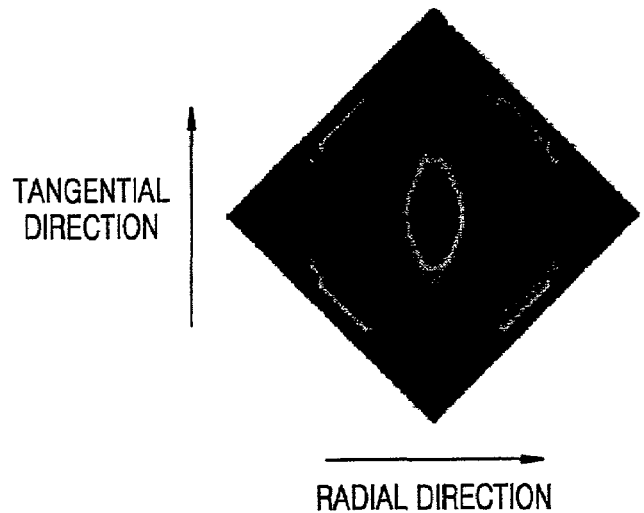
FIG. 9A illustrates a profile of the reflected/diffracted light beams of FIG. 7 from the exit pupil of the objective lens.
Figure 9B:
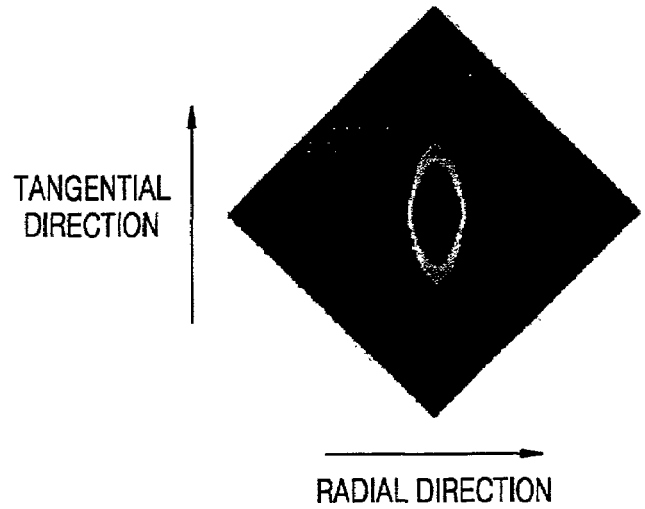
FIG. 9B illustrates a magnified view of a profile of the reflected/diffracted light beams of FIG. 7.
Figure 9C:
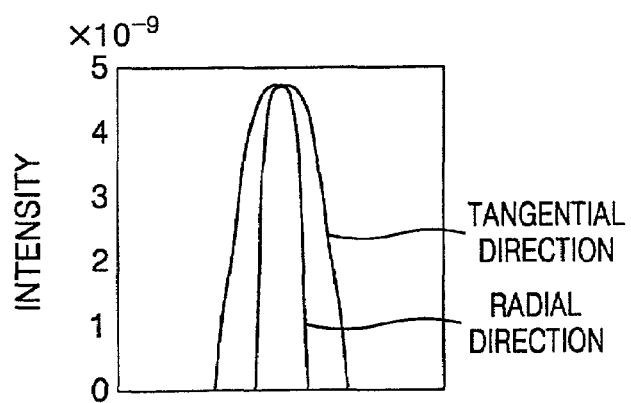
FIG. 9C illustrates an intensity distribution of an overlapping light beam portion in the tangential and radial directions.
Figure 10A:
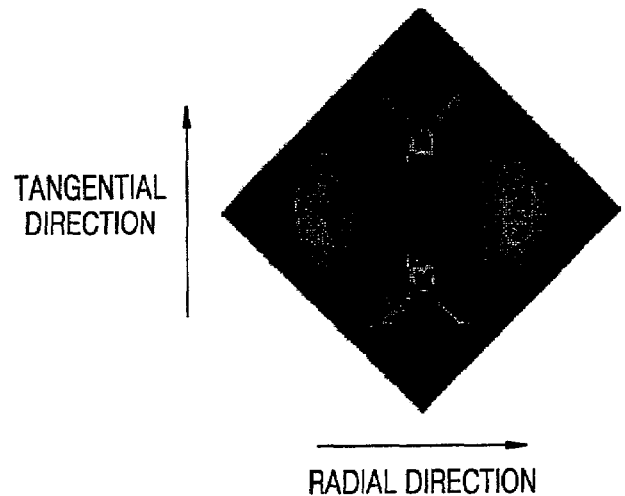
FIG. 10A illustrates a profile of the reflected/diffracted light beams of FIG. 7 from the exit pupil of the objective lens.
Figure 10B:
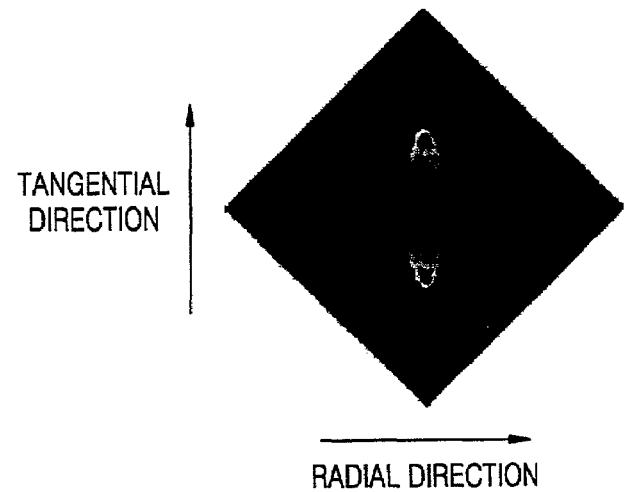
FIG. 10B illustrates a magnified view of a profile of the reflected/diffracted light beams of FIG. 7.
Figure 10C:
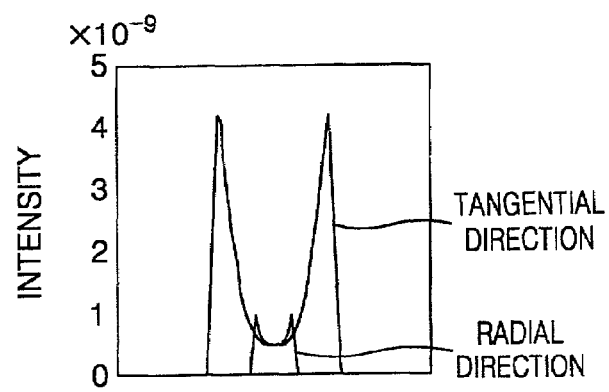
FIG. 10C illustrates an intensity distribution of an overlapping light beam portion in the tangential and radial directions.

FIGS. 8A through 10C illustrate changes of the light beam deflected/diffracted from the land-groove type recording medium depending on whether aberration occurs. In particular, FIGS. 8A, 9A, and 10A illustrate profiles of the reflected/diffracted light beam LB viewed from the exit pupil of the objective lens 57. FIGS. 8B, 9B, and 10B are magnified views of FIGS. 8A, 9A, and 10A, respectively; illustrating an overlapping portion of the $\pm 1^{st}$ order diffracted light beams (hereinafter, referred to as "overlapping light beam portion"). FIGS. 8C, 9C, and 10C illustrate an intensity distribution of the overlapping light beam portion in the tangential and radial directions.

As shown in FIGS. 8A through 10C, the intensity distribution of the overlapping light beam portion is almost uniform when no aberration occurs, i.e., also almost uniform with respect to defocus, as will be described later. However, when spherical aberration occurs, the intensity distribution of the overlapping light beam portion has a Gaussian distribution or an inverse Gaussian distribution depending on a polarity of aberration.

In particular, as shown in FIGS. 8A, 8B and 8C, in the case where no aberration occurs, the intensity distribution of the overlapping light beam portion is almost uniform. Meanwhile, in a case where a predetermined amount of spherical aberration occurs, for example, $W_{40d}=0.9393\ \lambda$, the overlapping light beam portion has a Gaussian intensity distribution, as shown in FIGS. 9A, 9B, and 9C, in which a center portion has a peak intensity. Further, as shown in FIGS. 9A, 9B, and 9C, the intensity of the light beam exponentially decreases with increased distance from the center portion. In a case where spherical aberration occurs in a direction opposite to that of FIGS. 9A, 9B, and 9C, i.e., $W_{40d}=-0.9393\ \lambda$, the overlapping light beam portion has an inverse Gaussian distribution, in which the center portion has the lowest intensity and the intensity of the light beam exponentially increases with increased distance from the center portion. In other words, the overlapping light beam portion has a symmetrical intensity distribution around the optical axis, but a positive spherical aberration and a negative spherical aberration result in intensity distributions having opposite profiles.

When the land-groove type recording medium described above is used as the recording medium 50 and no spherical aberration occurs, the overlapping light beam portion has a uniform distribution. Thus, for illustrative purposes, the light beam division and detection unit divides/diffracts the overlapping light beam portion into, for example, a first light beam portion $P_1$ on the optical axis (see FIG. 7), and second and third light beam portions $P_2$ and $P_3$ around the first light beam portion $P_1$, in an equal area ratio, and detects signals resulting from the first, second, and third light beam portions $P_1$, $P_2$, and $P_3$. The spherical aberration detection circuit 70 is constructed such that a spherical aberration signal is detected by subtracting the second detection signal resulting from the second and third light beam portions $P_2$ and $P_3$ from the first detection signal resulting from the first light beam portion $P_1$.

Figure 11:
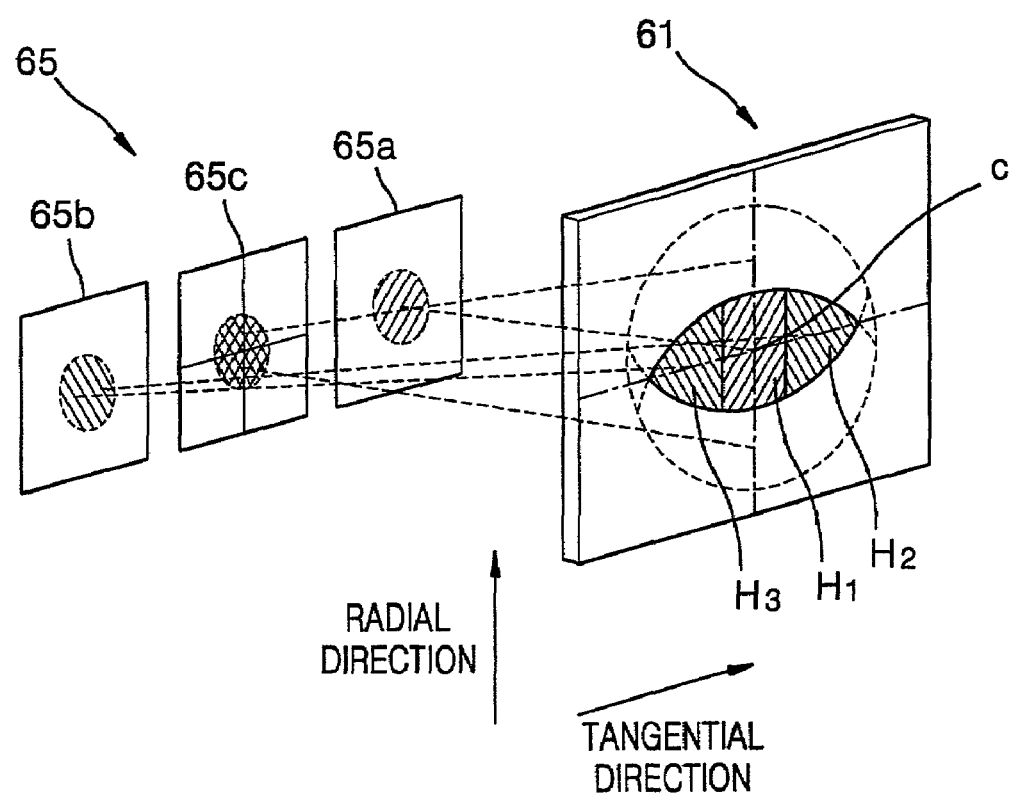
FIG. 11 illustrates an example of the light beam divider and detection unit of the optical pickup of FIG. 6 for a next generation DVD family land/groove recording medium.

Referring to FIG. 11, the HOE 61 of the light beam division and detection unit includes a first pattern area $H_1$ which diffracts/deflects the first light beam portion $P_1$ on an optical axis c, and second and third pattern areas $H_2$ and $H_3$ which diffract/deflect the second and third light beam portions $P_2$ and $P_3$. In this case, because the second and third light beam portions $P_2$ and $P_3$ have similar intensity profiles, for illustrative purposes, the second and third pattern areas $H_2$ and $H_3$ are formed having the same hologram pattern, so that the second and third light beam portions $P_2$ and $P_3$ are received by a single photodetector.

The photodetector unit 65 includes a first photodetector 65a receiving the first light beam portion $P_1$ diffracted/deflected from the first pattern area $H_1$. The photodetector unit 65 further includes a second photodetector 65b receiving the second and third light beam portions $P_2$ and $P_3$ focused at the same location by the condensing lens 59 after being diffracted/deflected in the same direction by the first and second pattern areas $H_2$ and $H_3$.

A first detection signal Pi from the first photodetector 65a, and a second detection signal Po from the second photodetector 65b are input to the spherical aberration detection circuit 70. The spherical aberration detection circuit 70 normalizes, for example, a difference signal (Pi–Po) of the first and second detection signals Pi and Po with respect to a sum of the first and second detection signals (Pi+Po) and outputs a spherical aberration signal SES expressed as (Pi–Po)/(Pi+Po).

Although in FIG. 11 the HOE 61 is designed to divide and diffract the overlapping light beam portion into the first light beam portion $P_1$ symmetrically around the optical axis c and the second and third light beam portions $P_2$ and $P_3$ symmetrically around the first light beam portion $P_1$ in the tangential direction, and the photodetector unit 65 is designed to be suitable for the HOE 61, it will be appreciated that the light beam division and detection unit is not limited to this configuration. That is, as shown in FIGS. 9C and 10C, because the intensity distribution of the overlapping light beam portion is symmetrical around the optical axis in the radial direction as well as in the tangential direction of recording medium, and because positive spherical aberration and negative spherical aberration lead to intensity distributions having opposite profiles, the light beam division and detection unit of the optical pickup according to the present invention may be designed such that the overlapping light beam portion is divided in the radial direction and then detected by the light beam division and detection unit.

Figure 12:
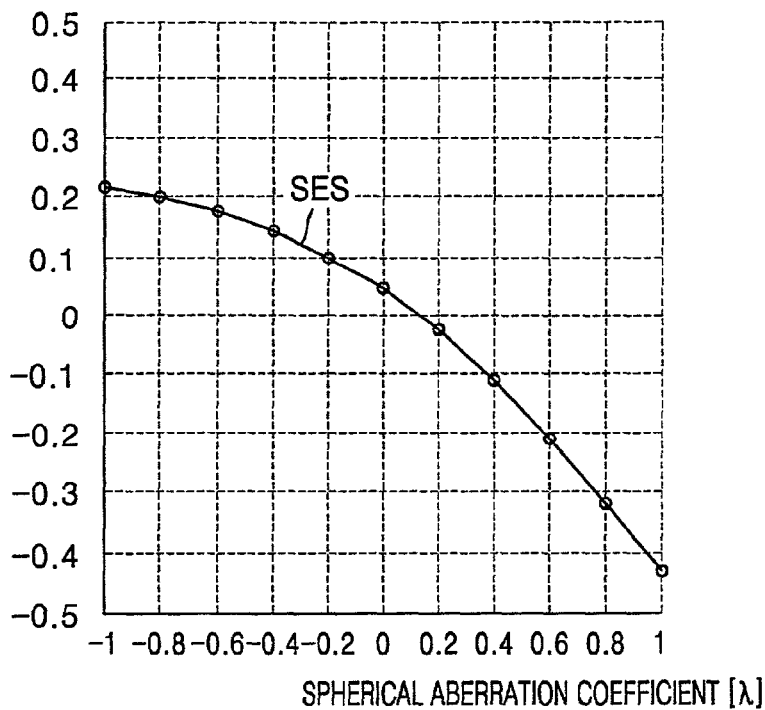
FIG. 12 is a graph of a spherical aberration signal detected by a spherical aberration detection circuit of the present invention with respect to spherical aberration.
Figure 13:
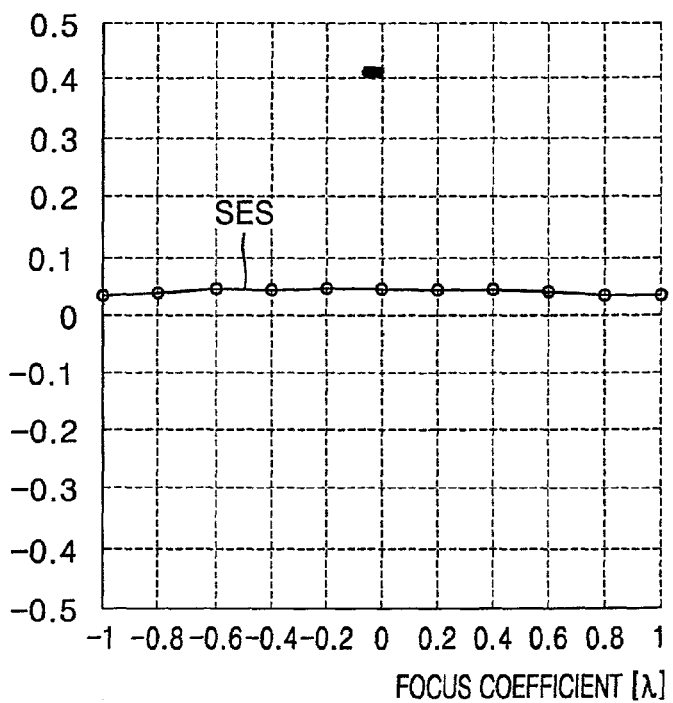
FIG. 13 is a graph of the spherical aberration signal detected by the spherical aberration detection circuit of the present invention with respect to defocus.

The optical pickup according to the present invention including the light beam division and detection unit described above can detect a spherical aberration signal SES as follows without being affected by defocus. FIG. 12 is a graph of the spherical aberration signal SES detected by the spherical aberration detection circuit 70 with respect to spherical aberration. Here, a horizontal axis represents a coefficient of spherical aberration representing an amount of spherical aberration in units of $\lambda$. FIG. 13 is a graph of the spherical aberration signal SES detected by the spherical aberration detection circuit 70 with respect to defocus. Here, the horizontal axis represents a coefficient of defocus representing the amount of defocus in units of $\lambda$.

As shown in FIG. 12, the spherical aberration signal decreases as the amount of spherical aberration increases from negative values to positive values. The polarity of the spherical aberration signal SES is inverted around a point at which a spherical aberration coefficient is zero, according to a direction of spherical aberration. The spherical aberration signal SES has negative values for the spherical aberration in a positive direction and positive values for the spherical aberration in a negative direction.

Figure 14A:
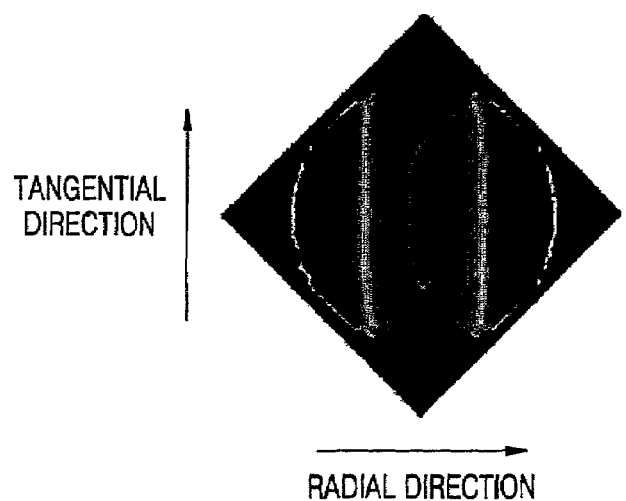
FIG. 14A illustrates an intensity distribution of the reflected/diffracted light beam of FIG. 7 when defocus occurs.
Figure 14B:
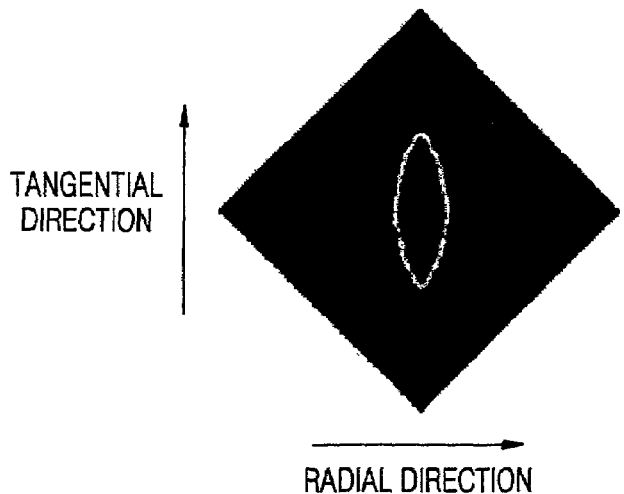
FIG. 14B illustrates the intensity distribution of the reflected/diffracted light beam of FIG. 7 when a predetermined amount of defocus occurs without spherical aberration.
Figure 14C:
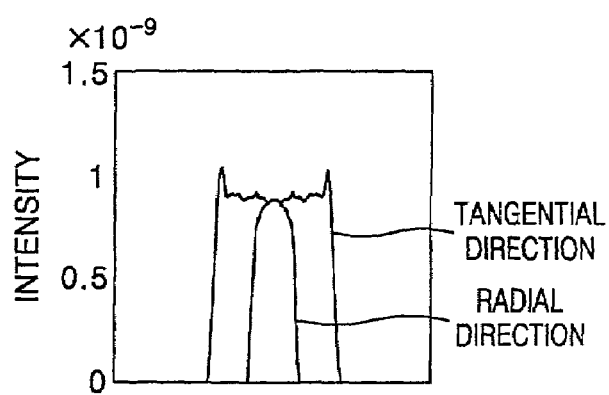
FIG. 14C illustrates the intensity distribution of the reflected/diffracted light beam of FIG. 7 when a predetermined amount of defocus occurs without spherical aberration.

As shown in FIG. 13, the spherical aberration signal SES is not affected by defocus. This is also evident in FIGS. 14A through 14C, which illustrate a profile and an intensity distribution of the light beam reflected/diffracted from the land-groove type recording medium when a predetermined amount of defocus ($W_{20}=0.2425\lambda$) occurs without spherical aberration. As shown in FIGS. 14A through 14C, although a predetermined amount of defocus ($W_{20}=0.2425\lambda$) occurs, the intensity distribution of the overlapping light beam portion almost does not change, unlike when spherical aberration occurs. In other words, if only defocus occurs without spherical aberration, the intensity of the overlapping light beam portion is constant in the tangential direction, but slightly varies in the radial direction. However, such minor intensity variation in the radial direction is negligible compared with the intensity variation caused by spherical aberration. Thus, the intensity distribution of the overlapping light beam portion is almost uniform in every direction.

The offsets of the spherical aberration signal SES when no spherical aberration occurs as shown in FIG. 12 and when defocus occurs, as shown in FIG. 13 can be eliminated by dividing the light beam into the first, second, and third light beam portions $P_1$, $P_2$, and $P_3$ in an optimal ratio, or by designing the spherical aberration detection circuit 70 such that the spherical aberration detection signal SES is detected by amplifying at least one of the first and second detection signals Pi and Po with a predetermined gain factor and then processing the detection signals.

Therefore, the optical pickup according to the present invention can accurately detect a spherical aberration signal SES using the light beam division and detection unit and the spherical aberration detection circuit 70 described above, without being affected by defocus. In the present invention, the spherical aberration signal is detected using a plurality of light beam portions divided from the particular light beam portion that is greatly affected by spherical aberration (i.e., the overlapping light beam portion having ±1st order diffracted light beams for a land-groove type recording medium). Thus, even when spherical aberration greater than a predetermined amount occurs, the spherical aberration can be accurately detected without the problem of signal difference saturation as in a conventional detection technique.

Thus, both the amount and the polarity of spherical aberration caused by thickness variation of the recording medium can be accurately detected using the light beam division and detection unit and the spherical aberration detection circuit 70 according to the present invention. In addition, by driving the spherical aberration compensation element 75 according to the detected spherical aberration signal SES, spherical aberration caused by thickness variation of the recording medium 50 can be corrected.

Further, the HOE 61 and the photodetector unit 65 can detect an information reproduction signal from the recording medium 50, a focus error signal, and/or a tracking error signal, using the detection signal resulting from the light beam portion excluding the particular light beam portion. For example, when the above-described land-groove type recording medium is used as the recording medium 50, the HOE 61 is designed such that the particular light beam portion entering through the peripheral area is transmitted exclusive of the first, second, and third pattern areas $H_1$, $H_2$, and $H_3$. At the same time, the photodetector unit 65 is designed such that the photodetector unit 65 further includes a third photodetector 65c, as shown in FIG. 11, which receives the light beam portion just transmitted through the HOE 61. In this case, for example, the third photodetector 65c has a divided configuration including at least four (4) sections to detect a focus error signal and/or a tracking error signal.

Although the preferred embodiments of the present invention are described with reference to the light beam division and detection unit designed for recording and reproduction on/from a future generation DVD family land-groove type recording medium, it will be appreciated that the configuration of the light beam division and detection unit can be modified for any recording medium with various formats. The configuration of the optical pickup according to the present invention of FIG. 6 detecting and/or correcting spherical aberration caused by thickness variation of the recording medium 50, is merely illustrative and is not intended to limit the scope of the present invention.

As described above, the optical pickup according to the present invention detects a spherical aberration signal by dividing a particular light beam portion of a light beam passed through an objective lens after having been reflected/diffracted from a recording medium into a plurality of light beam portions, and detecting the divided light beam portions. The particular light beam portion is greatly affected by spherical aberration caused by thickness variation of the recording medium. Thus, spherical aberration caused by thickness variation of the recording medium can be accurately detected without being affected by defocus. In addition, the spherical aberration caused by thickness variation of a recording medium may be compensated for by driving a spherical aberration compensation element according to a detected spherical aberration signal.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An optical pickup for a recording medium, comprising:
   a light source generating and emitting a light beam;
   an objective lens focusing the light beam from the light source to form a light spot on the recording medium;
   an optical path changer disposed on an optical path between the light source and the objective lens, altering a traveling path of the light beam;
   a light beam division and detection unit dividing a particular light beam portion of the light beam passed through the objective lens after being reflected and/or diffracted from the recording medium into sub-divided first, second and third light beam portions, and detecting a first detection signal from the first light beam portion and a second detection signal from the second and third light beam portions; and
   a spherical aberration detection circuit processing the first and second detection signals resulting from the sub-divided first, second and third light beam portions to detect spherical aberration caused by thickness variation of the recording medium,
   wherein the particular light beam portion divides into the first light beam portion on an axis crossing an optical axis parallel to a radial direction or a tangential direction of the recording medium, and the second and third light beam portions, one at either side of the first light beam portion in the tangential direction or the radial direction of the recording medium.

2. The optical pickup of claim 1, wherein the spherical aberration detection circuit detects a spherical aberration signal indicative of the spherical aberration by subtracting the second detection signal from the first detection signal, where the spherical aberration signal is not affected by defocus.

3. The optical pickup of claim 2, wherein a polarity of the spherical aberration signal is inverted around a point at which a spherical aberration coefficient is zero, according to a direction of the spherical aberration, and the spherical aberration signal has negative values for the spherical aberration in a positive direction and positive values for the spherical aberration in a negative direction.

4. The optical pickup of claim 1, wherein the light beam division and detection unit comprises:
   a hologram optical element comprising first, second, and third pattern areas dividing/diffracting the particular light beam portion into the first, second, and third light beam portions; and
   a photodetector unit comprising a first photodetector receiving the first light beam portion passed through the first pattern area and outputting the first detection signal, and a second photodetector receiving the second and third light beam portions passed through the second and third pattern areas and outputting the second detection signal.

5. The optical pickup of claim 4, wherein the recording medium comprises a land-groove structure where the light beam radiated onto the recording medium is reflected and diffracted into $0^{th}$-order and $\pm 1^{st}$-order diffracted light beams, the $\pm 1^{st}$-order diffracted light beams partially overlapping at an exit pupil of the objective lens, and the particular light beam portion corresponds to an overlapping portion of the $\pm 1^{st}$-order diffracted light beams.

6. The optical pickup of claim 5, wherein the first, second and third pattern areas of the hologram optical element divide and diffract the overlapping light beam portion into the first light beam portion on the optical axis, and one of the second and third light beam portions is at either side of the first light beam portion in the tangential direction or the radial direction of the recording medium.

7. The optical pickup of claim 6, wherein the recording medium has a format satisfying the following equation:

$$\frac{\lambda}{2 \times NA \times Gw} < 1$$

where $\lambda$ denotes a wavelength of the light source, NA denotes a numerical aperture of the objective lens, and Gw denotes a groove width of the recording medium.

8. The optical pickup of claim 4, wherein the photodetector unit further comprises a third photodetector receiving a remaining light beam portion passed through the hologram optical element, excluding the particular light beam portion, and detecting an information reproduction signal from the recording medium, a focus error signal, and/or a tracking error signal.

9. The optical pickup of claim 6, wherein the photodetector unit further comprises a third photodetector receiving a remaining light beam portion passed through the hologram optical element, excluding the particular light beam portion, and detecting an information reproduction signal from the recording medium, a focus error signal, and/or a tracking error signal.

10. The optical pickup of claim 4, wherein the second and third pattern areas comprise identical hologram patterns, and the first pattern area comprises a hologram pattern different from the second and third pattern areas.

11. The optical pickup of claim 5, wherein the second and third pattern areas comprise identical hologram patterns, and the first pattern area comprises a hologram pattern different from the second and third pattern areas.

12. The optical pickup of claim 2, wherein the recording medium comprises lands and grooves where the light beam radiated onto the recording medium is reflected and diffracted into $0^{th}$-order and $\pm 1^{st}$-order diffracted light beams, and light spots of the $\pm 1^{st}$-order diffracted light beams partially overlap at an exit pupil of the objective lens, and the particular light beam portion corresponds to an overlapping portion of the $\pm 1^{st}$-order diffracted light beams.

13. The optical pickup of claim 12, wherein the recording medium has a format satisfying the following equation:

$$\frac{\lambda}{2 \times NA \times Gw} < 1$$

where $\lambda$ denotes a wavelength of the light source, NA denotes a numerical aperture of the objective lens, and Gw denotes a groove width of the recording medium.

14. The optical pickup of claim 2, wherein the spherical aberration detection circuit detects the spherical aberration signal by normalizing a difference signal obtained by subtracting the second detection signal from the first detection signal, and the light beam division and detection unit outputs the first and second detection signals with respect to a sum of the first and second detection signals.

15. The optical pickup of claim 14, wherein the spherical aberration detection circuit amplifies at least one of the first and second detection signals with a predetermined gain factor, and processes the amplified at least one of the first and second detection signals to detect the spherical aberration signal.

16. The optical pickup of claim 2, wherein the spherical aberration detection circuit amplifies at least one of the first and second detection signals with a predetermined gain factor, and processes the amplified at least one of the first and second detection signals to detect the spherical aberration signal.

17. The optical pickup of claim 1, wherein the light beam division and detection unit detects an information reproduction signal from the recording medium, a focus error signal, and/or a tracking error signal, using a detection signal resulting from a remaining light beam portion of the light beam excluding the particular light beam portion.

18. The optical pickup of claim 2, wherein the light beam division and detection unit detects an information reproduction signal from the recording medium, a focus error signal, and/or a tracking error signal, using a detection signal resulting from a remaining light beam portion of the light beam excluding the particular light beam portion.

19. The optical pickup of claim 1, wherein:
the light beam division and detection unit divides and/or diffracts the light beam passed through the objective lens into the first light beam portion on the optical axis and second and third light beam portions around the first light beam portion, in an equal area ratio, and detects a first detection signal resulting from the first light beam portion and a second detection signal resulting from the second and third light beam portions, respectively; and
the spherical aberration detection circuit detects a spherical aberration signal by subtracting the second detection signal resulting from the second and third light beam portions from the first detection signal resulting from the first light beam portion.

20. The optical pickup of claim 1, further comprising a spherical aberration compensation element disposed on an optical path between the optical path changer and the objective lens, to correct spherical aberration caused by thickness variation of the recording medium, and driven according to the spherical aberration detected by the spherical aberration detection circuit.

21. The optical pickup of claim 20, wherein the spherical aberration compensation element comprises a liquid crystal plate comprising two transparent substrates having electrode patterns, wherein the liquid crystal plate is driven according to the spherical aberration where a shape of a wavefront of the light beam is changed into an inverse shape of the spherical aberration to compensate for the spherical aberration caused by the thickness variation of the recording medium.

22. The optical pickup of claim 2, further comprising a spherical aberration compensation element disposed on an optical path between the optical path changer and the objective lens, to correct spherical aberration caused by thickness variation of the recording medium, and driven according to the spherical aberration signal detected by the spherical aberration detection circuit.

23. The optical pickup of claim 22, wherein the spherical aberration compensation element comprises a liquid crystal plate comprising two transparent substrates having electrode patterns, wherein the liquid crystal plate is driven according to the spherical aberration signal where a shape of a wavefront of the light beam is changed into an inverse shape of the spherical aberration to compensate for the spherical aberration caused by the thickness variation of the recording medium.

24. The optical pickup of claim 1, wherein the light source comprises a semiconductor laser or a vertical cavity surface emitting laser.

25. The optical pickup of claim 1, wherein the optical path changer comprises a beam splitter transmitting and reflecting the incident light beam in a predetermined ratio.

26. The optical pickup of claim 1, wherein the optical path changer comprises a combination of a polarizing beam splitter selectively transmitting or reflecting the light beam according to a polarization of the light beam, and a quarter-wave plate, between the polarizing beam splitter and the objective lens, changing a phase of the light beam.

27. The optical pickup of claim 1, wherein the light source comprises a blue-light semiconductor laser emitting the light beam having a wavelength of 400–420 nm; and wherein the objective lens is a condensing lens having a numerical aperture (NA) of at least 0.7 to record or reproduce on/from the recording medium.

28. The optical pickup of claim 1, further comprising:
a collimating lens disposed on the optical path between the light source and the optical path changer, collimating a diverging light beam from the light source; and
a sensing lens disposed on the optical path between the optical path changer and the light beam division and detection unit, condensing the light beam received by the light beam division and detection unit.

29. The optical pickup of claim 1, wherein the photodetector unit separately receives a light beam portion excluding the particular light beam portion from the hologram optical element and the particular light beam portion and outputs a particular light beam portion detection signal indicative of the particular light beam portion to detect a spherical aberration signal, and outputs a rest of a light beam portion detection signal indicative of the rest of the light beam portion to detect an information reproduction signal.

30. The optical pickup of claim 1, wherein the photodetector unit:
separately receives the light beam portion excluding the particular light beam portion from the hologram optical element and the particular light beam portion, and
outputs a particular light beam portion detection signal corresponding to the particular light beam portion indicative of spherical aberration, and outputs a rest of light beam portion detection signal corresponding to the light beam portion excluding the particular light beam portion indicative of an information reproduction signal.

31. The optical pickup of claim 1, wherein the photodetector unit:
receives the particular light beam portion from the hologram optical element, and
outputs a particular light beam portion detection signal corresponding to the particular light beam portion indicative of spherical aberration and an information reproduction signal.

32. An optical pickup for a recording medium, comprising:
a light source generating and emitting a light beam;
a light beam division and detection unit dividing a particular light beam portion of the light beam after being reflected/diffracted from the recording medium into sub-divided first, second and third light beams portions, and detecting a first detection signal from the first light beam portion and a second detection signal from the second and third light beam portions; and
a spherical aberration detection circuit processing the first and second detection signals resulting from the sub-divided first, second and third light beam portions to detect a spherical aberration signal caused by thickness variation of the recording medium,
wherein the particular light beam portion is divided into the first light beam portion on an axis crossing an optical axis parallel to a radial direction or a tangential direction of the recording medium, and the second and third light beam portions, one at either side of the first light beam portion in the tangential direction or the radial direction of the recording medium.

33. The optical pickup of claim 32, wherein the light beam division and detection unit comprises:
a photodetector unit comprising a first photodetector receiving the first light beam portion passed through a first pattern area and outputting a first detection signal, and a second photodector receiving the second and third light beam portions passed through second and third pattern areas and outputting a second detection signal.

34. The optical pickup of claim 32, wherein the light beam division and detection unit comprises:
a hologram optical element comprising a first pattern area diffracting/deflecting the first light beam portion on an optical axis, and second and third pattern areas diffracting/deflecting the second and third light beam portions, wherein the second and third pattern areas comprise a same hologram pattern, and
a photodetector unit comprising a first photodetector receiving the first light beam portion diffracted/deflected from the first pattern area and a second photodetector receiving the second and third light beam portions diffracted/deflected by the first and second pattern areas.

35. The optical pickup of claim 34, wherein the photodetector unit further comprises a third photodetector receiving a remaining light beam portion passed through the hologram optical element, excluding the particular light beam portion, and detecting an information reproduction signal from the recording medium, a focus error signal, and/or a tracking error signal.

36. The optical pickup of claim 35, wherein the third photodetector comprises a divided configuration comprising at least four sections to detect the focus error signal and/or the tracking error signal.

37. The optical pickup of claim 34, further comprising:
a condensing lens focusing the second and third light beam portions on the second photodetector.

38. The optical pickup of claim 34, wherein:
the spherical aberration detection circuit receives a first detection signal Pi from the first photodetector and a second detection signal Po from the second photodetector, normalizes a difference signal (Pi−Po) of the first and second detection signals Pi and Po with respect to a sum of the first and second detection signals (Pi+Po), and outputs a spherical aberration signal corresponding to (Pi−Po)/(Pi+Po), wherein the spherical aberration signal is not affected by defocus.

39. The optical pickup of claim 34, further comprising:

an objective lens focusing the light beam from the light source to form a light spot on the recording medium; and an optical path changer disposed on an optical path between the light source and the objective lens, altering a traveling path of the light beam.

40. The optical pickup of claim 39, wherein the recording medium comprises a land-groove structure where the light beam radiated onto the recording medium is reflected and diffracted into $0^{th}$-order and $\pm 1^{st}$-order diffracted light beams, the $\pm 1^{st}$-order diffracted light beams partially overlap at an exit pupil of the objective lens, and the particular light beam portion corresponds to the overlapping portion of the $\pm 1^{st}$-order diffracted light beams.

41. The optical pickup of claim 40, wherein the recording medium has a format satisfying the following equation:

$$\frac{\lambda}{2xNAxGw} < 1$$

where $\lambda$ denotes a wavelength of the light source, NA denotes a numerical aperture of the objective lens, and Gw denotes a groove width of the recording medium.

42. The optical pickup of claim 34, wherein the second and third pattern areas comprise identical pattern areas, and the first pattern area comprises a pattern area different from the second and third pattern areas.

43. An optical pickup, comprising:

a light source to emit a light beam onto a recording medium;

a hologram arranged to partition a particular light beam portion of the light beam reflected/diffracted from the recording medium into a first light beam portion on an axis crossing an optical axis parallel to a radial direction or a tangential direction of the recording medium, and second and third light beams portions, one at either side of the first light beam portion in the radial direction or the tangential direction of the recording medium;

a photodetector unit arranged to detect a first detection signal from the first light beam portion and a second detection signal from the second and third light beam portions; and a spherical aberration detection circuit to detect a spherical aberration signal caused by a thickness variation of the recording medium based on the first and second detection signals.

44. The optical pickup of claim 43, wherein the photodetector unit comprises:

a first photodetector coupled to receive the first light beam portion passed through a first pattern area of the hologram, and to generate the first detection signal; and a second photodector coupled to receive the second and third light beam portions passed through second and third pattern areas of the hologram, and to generate the second detection signal.

45. The optical pickup of claim 44, wherein the spherical aberration detection circuit normalizes, upon receipt of the first detection signal (Pi) from the first photodetector and the second detection signal (Po) from the second photodetector, a difference of the first and second detection signals (Pi−Po) with respect to a sum of the first and second detection signals (Pi+Po), to produce a spherical aberration signal corresponding to (Pi−Po)/(Pi+Po), such that the spherical aberration signal is not affected by defocus.

46. The optical pickup of claim 44, wherein the recording medium comprises a land-groove structure where the light beam radiated onto the recording medium is reflected and diffracted into $0^{th}$-order and $\pm 1^{st}$-order diffracted light beams, the $\pm 1^{st}$-order diffracted light beams partially overlap at an exit pupil of an objective lens disposed between the hologram and the recording medium, and the particular light beam portion corresponds to the overlapping portion of the $\pm 1^{st}$-order diffracted light beams.

47. The optical pickup of claim 46, wherein the recording medium has a format satisfying the equation:

$$\frac{\lambda}{2xNAxGw} < 1$$

where $\lambda$ denotes a wavelength of the light source, NA denotes a numerical aperture of the objective lens, and Gw denotes a groove width of the recording medium.

* * * * *